United States Patent [19]

Schumm, Jr.

[11] Patent Number: 4,608,279

[45] Date of Patent: Aug. 26, 1986

[54] GALVANIC CELLS HAVING ION EXCHANGE RESIN IN THEIR CATHODE MIX

[75] Inventor: Brooke Schumm, Jr., Bay Village, Ohio

[73] Assignee: Union Carbide Corporation, Danbury, Conn.

[21] Appl. No.: 686,750

[22] Filed: Dec. 27, 1984

[51] Int. Cl.$^4$ .............................................. H01M 6/06
[52] U.S. Cl. ................................ 429/224; 429/229; 429/232
[58] Field of Search ............... 429/224, 209, 212, 215, 429/216, 232, 229

[56] References Cited

U.S. PATENT DOCUMENTS

| | | | |
|---|---|---|---|
| 2,607,809 | 1/1949 | Pitzer | 429/224 X |
| 2,786,088 | 9/1952 | Robinson | 429/224 X |
| 2,844,642 | 7/1958 | Schwarz et al. | 429/224 X |
| 3,257,242 | 6/1966 | Euler et al. | 429/224 X |
| 3,558,364 | 10/1969 | Krey | 429/224 X |
| 3,730,777 | 5/1973 | Krey | 429/251 X |
| 3,888,700 | 6/1975 | Larsen | 429/166 |

FOREIGN PATENT DOCUMENTS

PP176DT  1/1974  Fed. Rep. of Germany .
1228092 10/1968  United Kingdom .
1170489 11/1968  United Kingdom .

Primary Examiner—Anthony Skapars
Attorney, Agent, or Firm—C. F. O'Brien

[57] ABSTRACT

Galvanic cells of the Leclanche and zinc chloride type which employ cathode mixes having relatively high ratios of EMD to conductive material and which include a minor amount of ion exchange resin in their cathode mixes exhibit enhanced light drain service and comparable heavy drain service relative to conventional cells having lower EMD to conductive material ratios.

11 Claims, No Drawings

GALVANIC CELLS HAVING ION EXCHANGE RESIN IN THEIR CATHODE MIX

FIELD OF THE INVENTION

This invention is directed to galvanic cells of the Leclanche or zinc chloride type wherein a minor amount of ion exchange resin is incorporated into such cells' cathode mix.

BACKGROUND OF THE INVENTION

Galvanic cells of the Leclanche or zinc chloride type typically employ an active cathode material which is primarily comprised of powdered electrolytic manganese dioxide ("EMD"). Because electrolytic manganese dioxide is a poorly conductive material a conductive material, such as graphite or carbon black, is generally incorporated into the cathode mix in order to impart sufficient conductivity to the cathode for most cell applications. Typically, active cathode material to conductive material weight ratios of about 4:1 to about 7:1 are employed in zinc chloride cells, with slightly higher ratios being employed in Leclanche cells. While increasing the active cathode material to conductive material ratio will improve a cell's light drain performance (as more active material is placed within the cathode mix), the resulting decrease in conductivity may greatly impair such cell's heavy drain performance.

Because devices which employ Leclanche or zinc chloride type galvanic cells are usually designed so as to accommodate cells of certain dimensions, there is generally a fixed volume within a cell's housing which is available for the cathode mix. Consequently, it is not possible to increase the light drain service of such cells by simply adding more cathode mix having a relatively low ratio of active cathode material to conductive material. Thus it would be desirable to provide higher ratios of active cathode material (i.e. EMD) to conductive material in the cathode mixes of Leclanche and zinc chloride cells so as to improve such cells' light drain service without impairing their heavy drain service.

It is therefore an object of this invention to provide a galvanic cell of the Leclanche or zinc chloride type having a cathode mix possessing an increased EMD to conductive material ratio (and therefore improved light drain service), which cell additionally exhibits good heavy drain service.

The foregoing and additional objects will become fully apparent from the following description and Examples.

DESCRIPTION OF THE INVENTION

This invention relates to a galvanic cell comprising an anode, an acidic electrolyte and a cathode mix comprised of electrolytic manganese dioxide and a conductive material; the improvement comprising a minor amount (i.e., less than 50 weight percent of the wet cathode mix) of ion exchange resin in said cathode mix. The presence of such ion exchange resin allows such cell to employ an increased electrolytic manganese dioxide to conductive material ratio in the cathode mix, thereby improving the cell's light drain service while not adversely affecting such cell's heavy drain service.

As is employed herein the term "heavy drain service" refers to service of "C" and "D" size cells through resistances of 4 ohms or less, whereas the term "light drain service" refers to service of "C" and "D" size cells through resistances greater than 4 ohms.

The ion exchange resins which may be employed in the practice of this invention may be of strong or weak basic, or strong or weak acidic character, with weak acid resins being preferred. Combinations of these types of resins may also be employed, although such combinations are not preferred.

The ion exchange resins which may be employed in the practice of this invention may be of the gel, zeolitic, or macroreticular type with macroreticular resins being preferred. Most preferably, the ion exchange resin is employed in the form of a coarse powder, about 90 weight percent of which will pass through a 20 Tyler mesh screen with about no more than about 10 weight percent greater than 16 Tyler mesh screen. However, finer or coarser particles may also be employed.

The ion exchange resin comprises a minor amount of the cathode and preferably comprises between about 0.4 and about 10.0 weight percent of the total weight of the wet cathode mix of the cell of this invention. More preferably, the resin comprises between about 0.5 and about 4.0 weight percent and most preferably the resin comprises between about 0.5 and about 1.0 weight percent of the wet cathode mix. Resin concentrations below about 0.4 weight percent are not preferred because the beneficial effect of such resins may not be generally realized at these lower concentrations. Resin concentrations above about 10.0 weight percent are not preferred because at such higher concentrations the resin will displace active cathode material as well as conductive material with the result that cell performance may be impaired.

The cell of this invention which incorporates ion exchange resin into its cathode mix may employ a higher ratio of EMD to conductive material than that ratio employed in conventional cells. Consequently, the cell of this invention generally exhibits improved light drain service relative to such conventional cells. Moreover, the presence of the ion exchange resin results in such cell exhibiting heavy drain service comparable to that demonstrated by conventional cells having lower weight ratios of EMD to conductive material.

Although not wishing to be held to any theory, it is surmised that such heavy drain service results because the resins provide additional buffer capacity, particularly in the cell's normal pH range. Moreover, it is believed that there is improvement in chemical diffusion throughout the cell which results in improved performance. Additionally, apparently dry resins contain up to 50% moisture and could thus be viewed as small packages of water. Near the end of discharge, the water may be released by the resins thereby wetting the cathode mix. Also, because ion exchange causes swelling of the resin (and thus swelling of the cathode) in the internal cell contacts could be improved.

The cathode mix of the cell of this invention comprises an acidic electrolyte, a conductive material, and an active cathode material (i.e. EMD), as well as the ion exchange resin.

Illustrative of the conductive materials which may be employed are carbons such as graphite, acetylene black and carbon black.

The acidic electrolyte generally comprises an aqueous solution of zinc chloride, typically with ammonium chloride added.

In addition, the cathode mix of the cells of this invention may further include a surfactant in order to increase the handleability of the mix. Such surfactants are well known to those skilled in the battery art, and are typically present in amounts of between about 0.002 and about 0.008 weight percent, based on the total weight of the wet cathode. The cathode mix may also contain other materials conventionally employed in acidic electrolyte galvanic cells, for example, electrolyte leakage inhibitors such as gum karaya. Typically such other materials comprise about 0.3 weight percent based on the total weight of the wet cathode mix.

The cathode mix of the cells of this invention is typically prepared as follows. The ion exchange resin may be blended dry with manganese dioxide, a conductive material and (optionally) solid ammonium chloride in a standard mix blender. Optionally, an electrolyte leakage inhibitor may be blended with the cathode mix. A sufficient amount of electrolyte solution, optionally containing a surfactant, is added to wet the mix to a desirable plasticity so that it can be packed into cells or molded into mix cakes.

The cathode mix is then incorporated into a carbon zinc cell of the Leclanche type or of the zinc chloride type by means well-known to those skilled in the art of battery manufacture.

Alternatively, the electrolytic manganese dioxide, electrolyte and conductive material may first be blended to form a dry cathode mix. After insertion into a cell container, this cathode mix is pierced to form at least one hole. Ion exchange resin (and possibly electrolyte) is inserted into said at least one hole prior to sealing of the cell. Preferably, in this process the ion exchange resin is mixed with an additive (such as gum karaya) to improve its handleability.

EXAMPLES

The following Examples are intended to further illustrate the invention and are not intended to limit the scope of the invention in any manner.

EXAMPLE 1

Several lots of "C" size cylindrical zinc chloride cells, each cell having a height of about 1.94 inches and a diameter of about 1.0 inch, where constructed with each comprising a zinc anode, a zinc chloride electrolyte, a methylcellulose separator and a cathode mix having the weight ratio of electrolytic manganese dioxide (in this Example a 1:1 mixture by weight of EMD purchased from Mitsui Corporation under the trade designation TSV and EMD purchased from ToyoSoda Corporation under the trade designation HF was employed) to acetylene black listed in Table 1 below. In certain of the lots, 1.0 weight percent, based upon the weight of the wet cathode mix, of a weak acid ion exchange resin (purchased from Dow Chemical Corporation under the trade designation Dowex CCR) was incorporated into the cathode mix. Three cells of each lot were discharged on one of four service tests and the service per cubic centimeter of cathode mix calculated. The four tests comprised discharging the cells at a constant temperature of 21° C. either:

(1) continuously through a resistance of 4 ohms until a closed circuit voltage of 0.75 volt was recorded (in the manner of ANSI test 14.2(41)); or (2) intermittently through a 4 ohm resistance for 4 minutes per hour, 8 hours per day until a closed circuit voltage of 0.75 volt was recorded (ANSI Test 14.2(15));

(3) intermittently through a resistance of 8 ohms during a continuous period of two hours daily until a closed circuit voltage of 0.75 volt occurred; or (4) intermittently through a resistance of 25 ohms during a continuous period of four hours daily until a closed circuit voltage of 0.75 volt occurred (in the manner of ANSI Test 14.2(49)).

The average values of such testing are listed in Table I.

TABLE I

Service per Cubic Centimeter of Cathode Mix
"C" Size Zinc Chloride Cells

| Cell Lot | Ion Exchange Resin | EMD to Acetylene Black Ratio | 4 Ohm[1] Continuous | 4 Ohm[1] Intermittent | 8 Ohm[2] Intermittent | 25 Ohm[2] Intermittent |
|---|---|---|---|---|---|---|
| A | No | 5.8:1 | 33 | 50.0 | 1.58 | 5.27 |
| B | Yes | 8:1 | 36 | 51.4 | 1.65 | 5.39 |
| C | No | 8:1 | 32 | 49.7 | 1.62 | 5.25 |

[1] minutes per cc of cathode mix
[2] hours per cc of cathode mix

The above results indicate that cells having a high EMD to conductive material (acetylene black) weight ratio of 8:1 had improved light drain service relative to conventional cells having a lower EMD to conductive material ratio of 5.8:1. Moreover, such ion exchange resin-containing cells provided improved heavy drain service, relative to cells having an identical EMD to conductive material ratio of 8:1 but not containing ion exchange resin in their cathode mix.

EXAMPLE 2

Several lots of "D" size cylindrical zinc chloride cells, each cell having a height of about 2.25 inches and a diameter of about 1.25 inches, were constructed with each cell comprising a zinc anode, a methylcellulose separator, and a cathode mix having an EMD (purchased from Mitsui Corporation under the trade designation TSV) to acetylene black weight ratio of 8:1. Certain of these lots of cells had cathode mixes containing 1.0 weight percent ion exchange resin, based on the total weight of the cathode mix, of the character indicated in Table II. Three cells of each lot were discharged on one of two service tests and the service per cubic centimeter of cathode mix determined. The two tests comprised discharging the cells at a constant temperature of 21° C. either:

(1) continuously through a resistance of 2.25 ohms until a closed circuit voltage of 0.65 volt occurred (ANSI Test 14.2(17)); or (2) intermittently through a resistance of 25 ohms during a continuous period of 4 hours daily until a closed circuit voltage of 0.75 volt occurred (in the manner of ANSI Test 14.2(50)).

The average values obtained are listed in Table II.

TABLE II

Service Per Cubic Centimeter of Cathode Mix
"D" Size Zinc Chloride Cells

| Cell Lot | Resin Type | 2.25 Ohm[1] Continuous | 25 Ohm[2] Intermittent |
|---|---|---|---|
| D | Weak Acid[3] | 22.4 | 6.3 |
| E | Strong Base[4] | 20.8 | 6.2 |
| F | Strong Acid[5] | 21.8 | 6.2 |

TABLE II-continued

| | Service Per Cubic Centimeter of Cathode Mix "D" Size Zinc Chloride Cells | | |
|---|---|---|---|
| Cell Lot | Resin Type | 2.25 Ohm[1] Continuous | 25 Ohm[2] Intermittent |
| G | None | 19.3 | 6.2 |

[1]Results in minutes per cc of cathode mix.
[2]Results in hours per cc of cathode mix.
[3]Purchased, from Dow Chemical Corporation under the trade designation Dowex CCR.
[4]Purchased, from Dow Chemical Corporation under the trade designation Dowex MSA.
[5]Purchased from Rohm & Hass Corporation under the trade designation Amberlyst 15.

The above data indicate that zinc chloride cells employing a high EMD to acetylene black ratio of 8:1 and containing an ion exchange resin in their cathode mix will exhibit desirable light drain service while still maintaining desirable heavy drain service. In contrast, cells having an identical EMD to conductive material ratio but not having an ion exchange resin in their cathode mix demonstrate reduced heavy drain service.

EXAMPLE 3

Several lots of "D" size zinc chloride cells were constructed with each cell comprising a zinc chloride electrolyte, a zinc anode, a starch coated paper separators, and a cathode mix having an EMD (purchased from Mitsui Corporation the trade designation AD-2) to acetylene black weight ratio of 8:1. Each lot of cells included 1.0 weight percent, based on the weight of the wet cathode mix, of the type of resin indicated in Table III. Three cells of each lot were discharged on one of two service tests and the service per cubic centimeter of cathode mix determined. The two tests comprised discharging the celss at a constant temperature of 21° C. either (1) continuously through a resistance of 2.25 ohms until a closed circuit voltage of 0.65 volt occurred (ANSI Test 14.2(17)); or (2) intermittently through a resistance of 25 ohms during a continuous period of 4 hours daily until a closed circuit voltage of 0.75 volt occurred (in the manner of ANSI Test 14.2(50)).

The average values obtained are listed in Table III.

TABLE III

| | Service Per Cubic Centimeter of Cathode Mix "D" Size Zinc Chloride Cells | | |
|---|---|---|---|
| Cell Lot | Resin Type | 2.25 Ohm[1] Continuous | 25 Ohm[2] Intermittent |
| H | Weak Acid[3] | 20.9 | 5.1 |
| I | Weak Base[4] | 20.7 | 5.1 |

[1]Results in minutes per cc of cathode mix.
[2]Results in hours per cc of cathode mix.
[3]Available from Dow Chemical Corporation under the trade designation Dowex CCR.
[4]Available from Dow Chemical Corporation under the trade designation Dowex MWA.

The above data indicate that both the light and heavy drain service exhibited by cells having a high EMD to conductive material ratio of 8:1 by weight and having a weak acid ion exchange resin in their cathode mix are about equal to that of identical cells having a weak base ion exchange resin in their cathode mix.

EXAMPLE 4

Several lots of "D" size Leclanche cells were constructed with each containing a zinc anode, a gelled electrolyte paste separator, and a cathode mix comprised of electrolytic manganese dioxide and acetylene black in a ratio of 10:1 by weight, except as indicated. Several of the lots contained 1.0 weight percent, based upon the weight of the wet cathode mix, of the ion exchange resin listed in Table IV. Three cells of each lot were discharged on one of two service tests and the service per cubic centimeter of cathode mix was calculated. The tests comprised discharging the cells at a constant temperature of 21° C. either:

(1) intermittently through a 2.25 ohm resistance for 4 minutes per hour, 8 hours per day and measuring the discharge time until closed circuit voltages of 0.9 volt and 0.65 volt were recorded (ANSI Test 14.2(17)); or (2) intermittently through a resistance of 25 ohms during a continuous period of 4 hours daily until a closed circuit voltage of 0.75 volt occurred (in the manner of ANSI Test 14.2(50)).

The average results for each lot are listed in Table IV.

TABLE IV

| | | Service per Cubic Centimeter of Cathode Mix "D"-size Leclanche Cells | | |
|---|---|---|---|---|
| Cell Lot | Resin Type | 2.25 ohm Intermittent[1] To 0.9 Volt | To 0.65 Volt | 25 Ohm Intermittent[2] |
| N | Weak Acid[3] | 23.1 | 29.5 | 5.85 |
| O | Weak Base[4] | 22.1 | 29.5 | 5.71 |
| P | Strong Base[5] | 22.3 | 29.2 | 5.76 |
| Q[6] | None | 21.6 | 25.3 | 5.30 |

[1]in minutes per cc of cathode mix.
[2]in hours per cc of cathode mix.
[3]purchased from Dow Chemical Corporation under the trade designation Dowex CCR.
[4]purchased from Dow Chemical Corporation under the trade designation Dowex WGR.
[5]purchased from Dow Chemical Corporation under the trade designation Dowex MSA.
[6]EMD to acetylene black ratio of 8:1 by weight.

The above results indicate that Leclanche cells containing ion exchange resin in their cathode mix and having an EMD to conductive material weight ratio of 10:1 exhibit improved light drain service and as good or better heavy drain service as conventional Leclanche cells having an EMD to conductive material ratio of 8:1 and no ion exchange resin in their cathode mix.

Although preferred embodiments of this invention have been described in detail, it is contemplated that modifications thereof may be made and some features may be employed without others, all within the spirit and scope of the invention.

What is claimed is:

1. A galvanic cell comprising
an anode;
an acidic electrolyte; and
a wet cathode mix comprising electrolytic manganese dioxide and a conductive material in a ratio of greater than about 7:1 by weight, and an ion exchange resin in an amount between about 0.5 and 4.0 weight percent of said wet cathode mix.

2. The galvanic cell of claim 1 wherein the ion exchange resin comprises between about 0.5 and about 1.0 weight percent of the wet cathode mix.

3. The galvanic cell of claim 1 wherein said cell is a Leclanche cell.

4. The cell of claim 1 wherein said ion exchange resin is an acid ion exchange resin.

5. The cell of claim 1 wherein said ion exchange resin is a base ion exchange resin.

6. The cell of claim 1 wherein said ion exchange resin is a macroreticular resin.

7. The cell of claim 1 wherein said ion exchange resin is a coarse powder, about 90 weight percent of which will pass through a 20 Tyler mesh screen.

8. The galvanic cell of claim 1 wherein the conductive material is at least one material selected from the group consisting of carbon black, acetylene black, and graphite.

9. The galvanic cell of claim 1 wherein the anode is composed of zinc.

10. The galvanic cell of claim 1 wherein the wet cathode mix additionally includes a surfactant.

11. The galvanic cell of claim 1 wherein the wet cathode mix additionally includes gum karaya.

* * * * *